United States Patent
Seletskiy et al.

(10) Patent No.: US 11,663,012 B1
(45) Date of Patent: May 30, 2023

(54) SYSTEMS AND METHODS FOR DETECTING COROUTINES

(71) Applicant: Cloud Linux Software Inc., Estero, FL (US)

(72) Inventors: Igor Seletskiy, Palo Alto, CA (US); Pavel Boldin, Kharkov (UA)

(73) Assignee: Cloud Linux Software Inc., Estero, FL (US)

( * ) Notice: Subject to any disclaimer, the term of this patent is extended or adjusted under 35 U.S.C. 154(b) by 23 days.

(21) Appl. No.: 17/536,163

(22) Filed: Nov. 29, 2021

(51) Int. Cl.
*G06F 9/44* (2018.01)
*G06F 9/38* (2018.01)
*G06F 9/30* (2018.01)
*G06F 11/36* (2006.01)

(52) U.S. Cl.
CPC ........ *G06F 9/3836* (2013.01); *G06F 9/30134* (2013.01); *G06F 11/3636* (2013.01); *G06F 11/3644* (2013.01)

(58) Field of Classification Search
CPC . G06F 9/3836; G06F 11/3636; G06F 11/3644
See application file for complete search history.

(56) References Cited

U.S. PATENT DOCUMENTS

| | | | | |
|---|---|---|---|---|
| 2007/0118836 | A1* | 5/2007 | Mensing | G06F 9/4843 718/102 |
| 2012/0246624 | A1* | 9/2012 | Halliday | G06F 11/3664 717/129 |
| 2013/0019227 | A1* | 1/2013 | Chiu | G06F 11/3628 707/769 |
| 2019/0079813 | A1* | 3/2019 | O'Connor | G06F 9/485 |

* cited by examiner

*Primary Examiner* — Hang Pan
(74) *Attorney, Agent, or Firm* — ArentFox Schiff LLP; Michael Fainberg (57) ABSTRACT

Disclosed herein are systems and method for detecting coroutines. A method may include: identifying an application running on a computing device, wherein the application includes a plurality of coroutines; determining an address of a common entry point for coroutines, wherein the common entry point is found in a memory of the application; identifying, using an injected code, at least one stack trace entry for the common entry point; detecting coroutine context data based on the at least one stack trace entry; adding an identifier of a coroutine associated with the coroutine context data to a list of detected coroutines; and storing the list of detected coroutines in target process memory associated with the application.

17 Claims, 5 Drawing Sheets

SYSTEMS AND METHODS FOR DETECTING COROUTINES

FIELD OF TECHNOLOGY

The present disclosure relates to the field of software patching, and, more specifically, to systems and methods for detecting coroutines.

BACKGROUND

Coroutines are light-weight individual paths of execution each comprising, a register set, a call stack, and a memory stack. Applications employ them for preemptive concurrent execution of asynchronous, event-driven, or input-output (IO)-bound code. Consider a coding scenario in which a first function calls a second function. In the case of subroutines, once the second function is executed, control does not return to the first function until execution of the second function is complete (i.e., the second function pops out of the call stack). In the case of coroutines, control is dynamically switched between the first function and the second function. For example, the second function may be called, may run momentarily, get suspended, and get shortly resumed after the first function has run momentarily.

During patching of code including coroutines, it becomes important to detect all coroutines because not identifying a coroutine stack may lead to the changing of code that is currently running or is about to run. This may ultimately lead to a crash of the program comprising the coroutines. Coroutine detection may also be used for tracing and deadlock analysis, which can reveal, for example, where coroutine-using processes spend most of their time during execution.

Coroutines are usually scheduled using an application-specific internal scheduler. Threads switch between execution of certain coroutines by changing the current stack pointer and instruction pointer. For example, QEMU is an event-driven program that uses "makecontext," "setjmp," or "longjmp" library calls (described by POSIX) to perform switches.

A coroutine context is a set of general registers, of the coroutine, that is stored in an architecture-specific buffer, such as "sigjmp_buf." Some of the values stored here may be additionally encoded (mangled) as a security measure (e.g., the values of "% rsp," "% rbp," and "% rip" are mangled). An application-specific coroutine implementation data structure usually includes this buffer as one of its members, and, given the buffer address, can be found by subtracting the buffer offset in the data structure.

Older versions of QEMU have no way of listing all coroutines, so different heuristics must be used to detect and list all of them. On CentOS7, QEMU uses the "tcmalloc" library for allocation of the memory, which allocates every coroutine stack at a page-aligned address. One approach to detecting all possible coroutines on the stack involves calculating the address of "_start_context" internal "glibc" function by executing a "makecontext" call from a shell-like parasite code uploaded to the target process. The pointer guard is then fetched from the process' thread-local storage. This pointer is used by "glibc" to encode vulnerable pointers for storing them securely (e.g., "% rbp," "% rsp," and "% rip" are encoded this way). The whole heap is then iterated, where coroutine stacks are allocated on a page-aligned basis, and traces of "_start_context" addresses are looked for. Once found, additional checks are performed to decide whether they are a coroutine stack.

Unfortunately, this method is slow and is quite limited as it only works in a specific setup of CentOS7 QEMU with the "tcmalloc" library that allocates coroutine stacks at page aligned areas There thus exists a need for a quicker and generalized way to detect coroutines.

SUMMARY

In one exemplary aspect, the techniques described herein relate to a method for detecting coroutines, the method including: identifying an application running on a computing device, wherein the application includes a plurality of coroutines; determining an address of a common entry point for coroutines, wherein the common entry point is found in a memory (e.g., heap) of the application; identifying, using an injected code, at least one stack trace entry for the common entry point; detecting coroutine context data based on the at least one stack trace entry; adding an identifier of a coroutine associated with the coroutine context data to a list of detected coroutines; and storing the list of detected coroutines in target process memory associated with the application.

In some aspects, the techniques described herein relate to a method, wherein the injected code is applied to the application as a live patch that is executed without restarting the application, and wherein the injected code enables detection of stacks that are not page-aligned.

In some aspects, the techniques described herein relate to a method, wherein determining the address of the common entry point is initiated in response to detecting a launch of the application.

In some aspects, the techniques described herein relate to a method, wherein detecting the coroutine context data further includes: tracing a call to a function used for coroutine operation in the application; detecting the coroutine context data passed to the function.

In some aspects, the techniques described herein relate to a method, wherein tracing the call further includes: finding, in code of the application, an instruction where a stack pointer register is updated with a value from a register or memory; placing a breakpoint on the instruction; and detecting the coroutine context data in response to a hit on the breakpoint.

In some aspects, the techniques described herein relate to a method, further including: applying a patch to a library function used to implement coroutines; detecting the coroutine context data by accessing registers and memory from the patch.

In some aspects, the techniques described herein relate to a method, further including: overriding coroutine implementation functions using a system library mechanism; detecting the coroutine context data by accessing registers and memory from the overridden coroutine implementation functions.

In some aspects, the techniques described herein relate to a method, further including parsing the list of detected coroutines by reading the target process memory associated with the application.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting coroutines. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
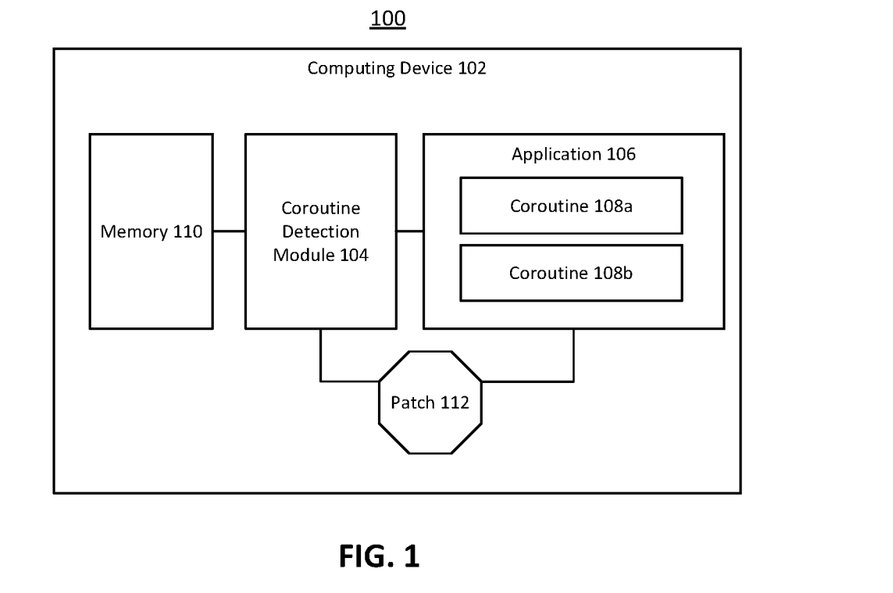
FIG. 1 is a block diagram illustrating a system for detecting coroutines.

FIG. 1 is a block diagram illustrating system 100 for detecting coroutines. System 100 includes computing device 102, which may be a computer system described in FIG. 9. Computing device 102 stores coroutine detection module 104, which is configured to detect coroutines running on computing device 102. For example, coroutine detection module 104 may detect coroutine 108a and coroutine 108b of application 106. The present disclosure describes approaches taken by coroutine detection module 104 to perform such detection. Approaches involve, but are not limited to, scanning memory 110 (e.g., a heap) for indications of a coroutine being executed and/or applying, to application 106, patch 112 that alters application 106 to inform coroutine detection module 104 whenever a coroutine is executed. These approaches are discussed in greater detail in the present disclosure.

Figure 2:
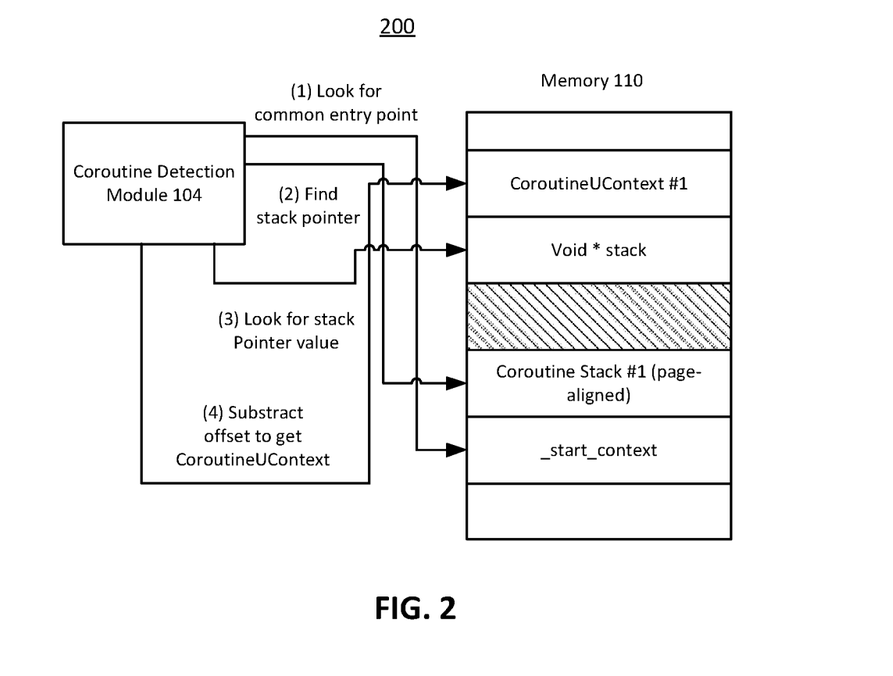
FIG. 2 is a block diagram illustrating a memory and a coroutine detection module.

FIG. 2 is block diagram 200 illustrating memory 110 and coroutine detection module 104. A task context is the minimum amount of required data used by a task (e.g., a process, thread, etc.) that should be saved to allow the task to be interrupted and reinstated at the interruption point. A coroutine is usually started by a library function such as "_start_context." This code then calls the function "setcontext," which writes directly to the "% rsp" stack pointer register and jumps to the coroutine payload. This leaves a "_start_context" address on the stack of the coroutine.

Applications usually store this stack pointer value along with information about the coroutine in an implementation-specific structure (e.g., CoroutineUContext in QEMU). The stack pointer value, stored in such a structure, can be found by looking through the process memory. The structure address can then be found by subtracting the offset of the stack pointer field. For example, if there are 40 bytes worth of data in the coroutine context structure before the stack pointer field, subtracting 40 out of stack pointer field's address will result in the coroutine context structure address itself. Thus, if the stack pointer field's address is at 0x10028, and the offset is 40 (0x28), the coroutine context structure is at address 0x10000. This structure contains internal data that references a given coroutine stack and may link other structures used for coroutine implementation (such as a list of coroutines).

In diagram 200, coroutine detection module 104 looks for a common entry point for coroutines such as "_start_context" in memory 110 that is used as a coroutine stack area. Then, coroutine detection module 104 finds the stack pointer by aligning the address of _start_context area to a page boundary and subsequently the stack pointer value (as described above). The address of structure "CoroutineUContext #1" is found by subtracting the offset of the stack pointer field from the address of the stack pointer value found in memory 110.

Figure 3:
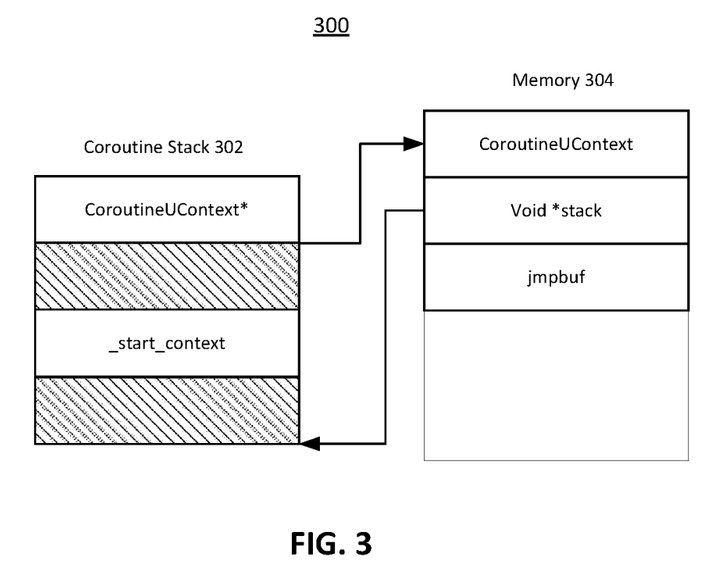
FIG. 3 is a block diagram illustrating a sanity check example.

FIG. 3 is block diagram 300 illustrating a sanity check example. Some applications store, on the coroutine stack (e.g., coroutine stack 302), a pointer to the implementation-specific coroutine structure (e.g., CoroutineUContext*) used by a given application (e.g., application 106). This is the case for QEMU on CentOS 7 for which the present disclosure describes using this information to check whether the provided memory region is indeed a coroutine stack.

Thus, heuristics for coroutine detection are usually application-specific and, given the stack pointer value and instruction pointer for a coroutine, involve parsing or finding internal data structures, and comparing fields at given offsets with reference values and/or between these fields. As discussed previously, QEMU does not maintain a full list of all coroutines. Some of them may be obtained from a list of throttled or overlapped I/O requests, and some of them may be obtained from other lists. In general, however, it is not possible to find all coroutines through pre-made lists.

Referring to diagram 200, coroutine detection module 104 may find the "_start_context" value (i.e., executing "makecontext") in coroutine stack 302. Coroutine detection module 104 may then look for the "_start_context" value on memory 304 (same as memory 110). Knowing where the pointer to the CoroutineUContext is stored in the coroutine stack, coroutine detection module 104 reads the value and checks that the void *stack field found in the CoroutineUContext structure points to coroutine stack 302. Subsequently, coroutine detection module 104 may read and de-mangle the encrypted content of structure "jmp_buf," that holds register values for the non-running coroutine. In short—the code implementing coroutines stores the pointer to the CoroutineUContext structure at a certain place inside the coroutine stack (it has nowhere else to put it). The offset of this value from the coroutine stack top can be calculated by looking at the machine code.

Figure 4:
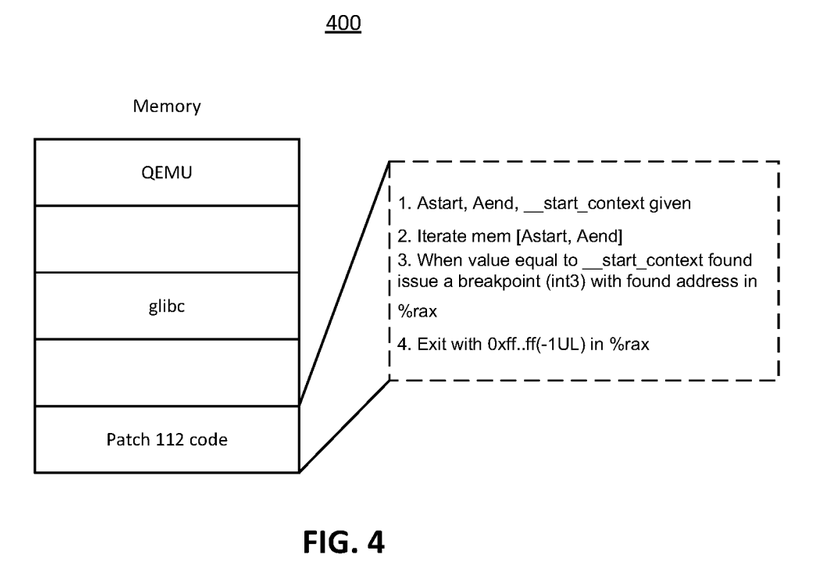
FIG. 4 is a block diagram illustrating detection of coroutines using ptrace.

FIG. 4 is block diagram 400 illustrating detection of coroutines using ptrace. The present disclosure describes scanning memory 110 to detect coroutines of application 106. In particular, coroutine detection module 104 looks through memory 110 for the traces of coroutine stacks and their entry point "_start_context." Using parasite code, which is loaded into the target process (e.g., patch 112 into application 106) and executed there, speeds up detection and allows coroutine detection module 104 to detect stacks that are not page-aligned (e.g., when no "tcmalloc library is loaded"). This is a deterministic approach.

Figure 5:
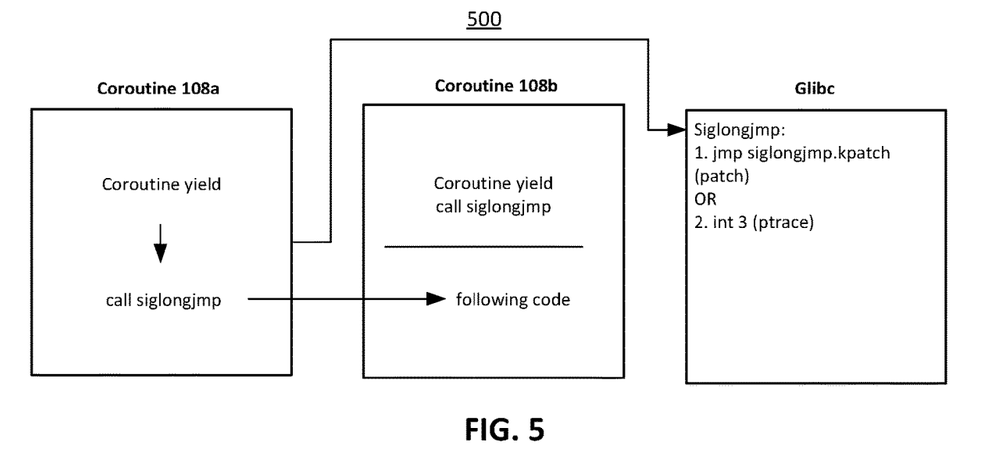
FIG. 5 is a block diagram illustrating detection of coroutine code.

In diagram 400, for example, patch 112 may be a coroutine finding shell code. Coroutine detection module 104 may get the _start_context address and then run the shell code. Pseudocode for patch 112 shows a plurality of commands, namely:

1. For given Astart, Aend, _start_context
2. Read memory contents of region [Astart, Aend] as long values
3. When value equal to _start_context is found in the provided region, issue a breakpoint (int3) with address of this value in % rax
4. After region is fully iterated, exit by issuing a breakpoint with −1UL in % rax FIG. 5 is block diagram 500 illustrating detection of coroutine code. In one aspect, coroutine detection module 104 may patch functions (e.g., using patch 112), such as "makecontext" and "siglongjmp," that are used for coroutine implementation (or setup breakpoints there). This reveals coroutine stacks, as well as the switches between them in the internal scheduler. In diagram 500, coroutine 108*a* calls glibc's siglongjmp function to switch to coroutine 108*b*. This call is being intercepted by the coroutine detection module either by applying a patch (for internal module) or placing a breakpoint (for ptrace module). Referring to the diagram, an arrow pointing to the glibc code shows the call to the siglongjmp function. The function is either patched ('jmp to siglongjmp.kpatch') or there is a breakpoint setup at its location (int3, that is intercepted by outside coroutine detection module operating via ptrace).

In one aspect, coroutine detection module 104 may be implemented as a loadable shared object that overrides system library functions used to implement coroutines. This module can then be preloaded by the system-specific mechanism such as LD_PRELOAD and provide an explicit list of coroutines.

Since there are rarely-executed coroutines, it is possible to not catch them all in a given time as there will be no stack switches to all coroutines. Thus, this is a probabilistic approach. Application 106 must be tracked from the start of its execution to ensure all the coroutines (e.g., coroutines 108*a* and 108*b*) are detected. Tracking coroutine switches long enough might reveal all of them. This method will not work if the application is using its own coroutine implementation, such as a Golang application.

Figure 6:
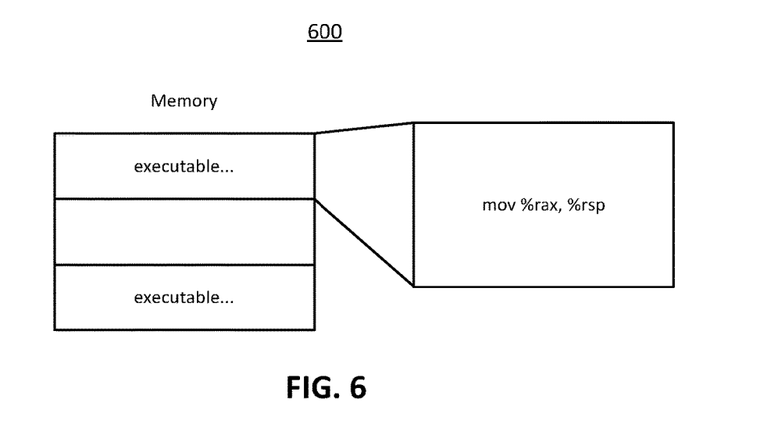
FIG. 6 is a block diagram illustrating decode instructions.

FIG. 6 is block diagram 600 illustrating decode instructions. In one aspect, coroutine detection module 104 may parse the entire code of the application and its libraries to find all the places where the stack pointer register is being written to directly (e.g., mov % rsp, % rax and mov 0x10(% r9), % rsp), and then locate code pieces around them where control can be transferred to a register-controlled value (e.g., jmp *% rax). For example, in diagram 600, coroutine detection module 104 finds all executable regions in the memory. For each executable, coroutine detection module 104 looks for instructions writing % rsp to % rax (e.g., mov % rax, % rsp).

Figure 7:
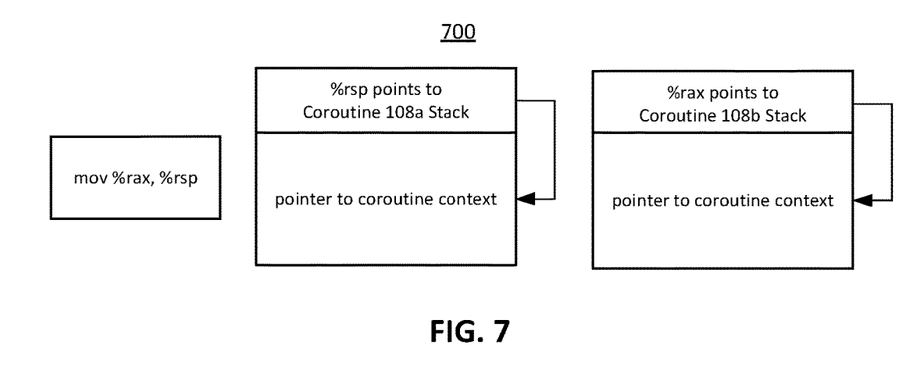
FIG. 7 is a block diagram illustrating finding pointers to coroutine context on a stack.

FIG. 7 is block diagram 700 illustrating finding pointers to coroutine context on a stack. Given the instruction addresses described in diagram 600, coroutine detection module 104 may install breakpoints on the instructions and track all the changes between different coroutine stacks and code, using these values as inputs for application-specific heuristics described above. Upon breakpoint hits, coroutine detection module 104 may find pointers to coroutine contexts on the coroutine stacks. For example, in diagram 700, coroutine #1 stack depicts a first pointer to the coroutine context and coroutine #2 stack depicts a second pointer to the coroutine context. Alternatively, coroutine detection module 104 may install a jump to parasite code/a patch that identifies pointers to coroutine contexts on the coroutine stack and may enlist coroutine context pointers to a list of coroutines.

This approach will work for Golang and is a probabilistic approach. Again, an application must be tracked from the start to ensure all the coroutines are detected and tracking coroutine switches long enough may reveal all of them. Golang uses its own implementation of coroutines that simply switches % rsp and loads a pointer to the Golang coroutine structure into the % r14 register. If coroutine detection module 104 catches the Go binary on writes to % rsp, the % r14 register value will give away the coroutine structure.

In one aspect, coroutine detection module 104 may install a kernel code that is run on every context switch, interrupt, and timer event in the form of a kernel module or a kernel patch. The kernel code may check the current stack pointer location in the currently running application. Sudden changes in the stack pointers supplied with changes in instruction pointer locations are then fed to the heuristics. This is a probabilistic approach.

In one aspect, coroutine detection module 104 may live-patch application-specific parts of the code that are used to create and maintain coroutines, and keep a list of all the coroutines present. This requires applying a live-patch at the application startup to be deterministic.

If any of the methods described above are used first to detect coroutines, coroutine detection module 104 may then apply a coroutine-tracking live-patch on a running application and enlist findings to the code. This will change a probabilistic approach to a deterministic approach.

In one aspect, some applications maintain an explicit list of coroutines that can be parsed by coroutine detection module 104 by reading target process' memory. This list will be exact. This is a deterministic approach.

Figure 8:
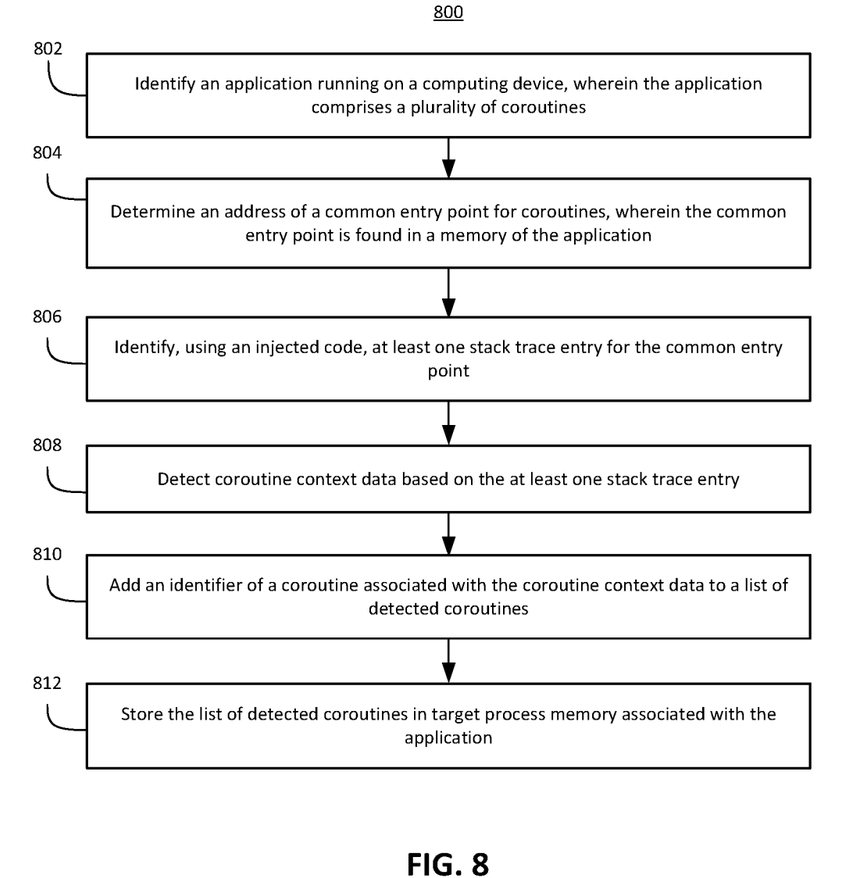
FIG. 8 illustrates a flow diagram of a method for detecting coroutines.

FIG. 8 illustrates a flow diagram of method 800 for detecting coroutines. In some aspects, method 800 is initiated in response to detecting a launch of the application. At 802, coroutine detection module 104 identifies the application (e.g., application 106) running on a computing device (e.g., computing device 102), wherein the application comprises a plurality of coroutines (e.g., coroutines 108*a*, 108*b*). At 804, coroutine detection module 104 determines an address of a common entry point for coroutines (e.g., "_start_context"), wherein the common entry point is found in a memory (e.g., memory 110) of the application. In some aspects, the common entry point address is placed on a stack or is found in a symbol table. For example, module 104 may execute a "makecontext" via ptrace on behalf of application 106 and may examine the stack layout to learn the address of the "_start_context" hidden trampoline. In another example, module 104 may read the symbol table of the Go binary to find the "mcall" address.

At 806, coroutine detection module 104 identifies, using an injected code (e.g., patch 112), at least one stack trace entry for the common entry point (e.g., glibc's _start_context or Go's mcall). In some aspects, the injected code is applied to the application as a live patch that is executed without restarting the application, and wherein the injected code enables detection of stacks that are not page-aligned. For example, module 104 may run injected code described in diagram 400 to look through the memory of the application where coroutine stacks might lay (that is, heap and anonymous mmaping for QEMU). If a common entry point address is found, that address is a potential candidate for the bottom of the coroutine stack.

At 808, coroutine detection module 104 detects coroutine context data based on the at least one stack trace entry. For example, using the address of the potential candidate, module 104 may use application-specific heuristics to find coroutine context data. For QEMU, module 104 looks for a pointer to CoroutineUContext at a known offset in the coroutine stack and performs a sanity check ensuring that the stack found indeed belongs to the coroutine identified by CoroutineUContext (e.g., diagram 300).

In some aspects, coroutine detection module 104 traces a call to a function used for coroutine operation in the application and detects the coroutine context data passed to the function. In the case of QEMU, coroutine detection module 104 may subtract the offset of "jmp_buf" and find CoroutineUContext.

In order to trace the call, coroutine detection module 104 may find, in the code of the application, an instruction where a stack pointer register is updated with a value from a register or memory. Coroutine detection module 104 may place a breakpoint on the instruction and detect a hit on the breakpoint (i.e., detect breakpoint hits). For example, for QEMU, coroutine detection module 104 may subtract an offset of % rsp in "jmp_buf" to find a pointer to "jmp_buf," and then subtract the offset of "jmp_buf" in CoroutineUContext to find a pointer to CoroutineUContext. For Go, coroutine detection module 104 may note the value of % rbx to find gobuf and % rdx for the Golang coroutine context variable g.

In some aspects, coroutine detection module 104 may detect the coroutine context data by applying a patch to a library function used to implement coroutines (such as "makecontext" and "siglongjmp") and detecting the coroutine context data by accessing registers and memory from the patch.

In some aspects, coroutine detection module 104 may detect the coroutine context data by overriding coroutine implementation functions using a system library mechanism and detecting the coroutine context data by accessing registers and memory from the overridden coroutine implementation functions. For example, coroutine detection module 104 may load a shared object that implements "makecontext" and "siglongjmp" functions via LD_PRELOAD mechanism of dynamic linker.

At 810, coroutine detection module 104 may add an identifier of a coroutine (i.e., a pointer to the application-specific coroutine context structure, the CoroutineUContext pointer) associated with the coroutine context data to a list of detected coroutines. At 812, coroutine detection module 104 stores the list of detected coroutines in target process memory associated with the application. For example, module 104 adds the CoroutineUContext pointer to the list of coroutines such as a single-linked list (e.g., {list_t *next; CoroutineUContext *coro;}). In some aspects, coroutine detection module 104 may later parse the list of detected coroutines by reading target process memory associated with the application (e.g., to apply a patch to a coroutine without causing error).

Figure 9:
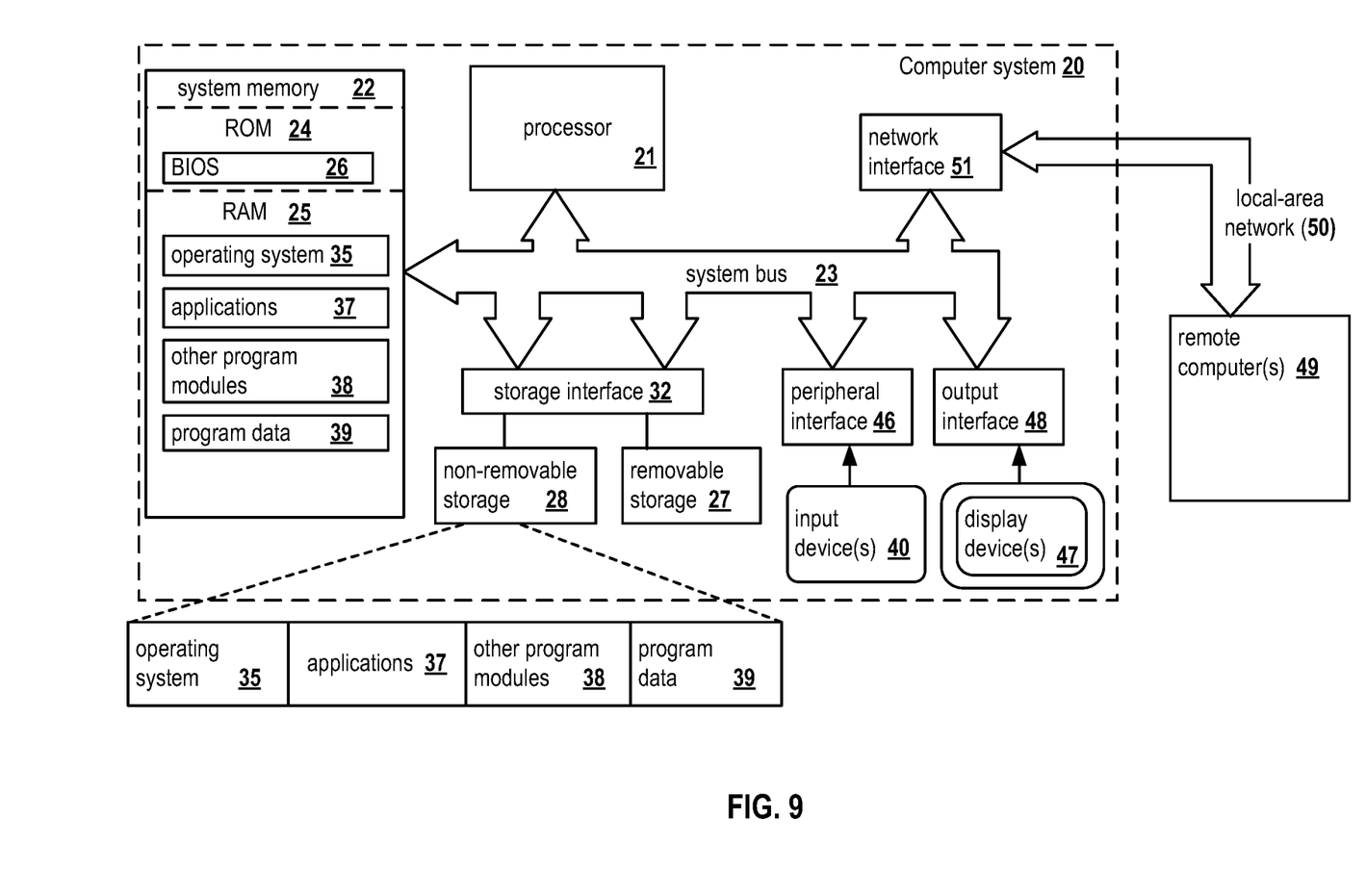
FIG. 9 presents an example of a general-purpose computer system on which aspects of the present disclosure can be implemented.

FIG. 9 is a block diagram illustrating a computer system 20 on which aspects of systems and methods for detecting coroutines may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-8 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting coroutines, the method comprising:
   identifying an application running on a computing device, wherein the application comprises a plurality of coroutines;
   determining an address of a common entry point for coroutines, wherein the common entry point is found in a memory of the application;
   identifying, using an injected code, at least one stack trace entry for the common entry point;
   detecting coroutine context data based on the at least one stack trace entry;
   adding an identifier of a coroutine associated with the coroutine context data to a list of detected coroutines; and
   storing the list of detected coroutines in target process memory associated with the application.

2. The method of claim 1, wherein the injected code is applied to the application as a live patch that is executed without restarting the application, and wherein the injected code enables detection of stacks that are not page-aligned.

3. The method of claim 1, wherein determining the address of the common entry point is initiated in response to detecting a launch of the application.

4. The method of claim 1, wherein detecting the coroutine context data further comprises:
   tracing a call to a function used for coroutine operation in the application;
   detecting the coroutine context data passed to the function.

5. The method of claim 4, wherein tracing the call further comprises:
   finding, in code of the application, an instruction where a stack pointer register is updated with a value from a register or memory;
   placing a breakpoint on the instruction; and
   detecting the coroutine context data in response to a hit on the breakpoint.

6. A method of claim 1, further comprising:
   applying a patch to a library function used to implement coroutines;
   detecting the coroutine context data by accessing registers and memory from the patch.

7. A method of claim 1, further comprising:
   overriding coroutine implementation functions using a system library mechanism;
   detecting the coroutine context data by accessing registers and memory from the overridden coroutine implementation functions.

8. The method of claim 1, further comprising parsing the list of detected coroutines by reading the target process memory associated with the application.

9. A system for detecting coroutines, comprising:
   a hardware processor configured to:
      identify an application running on a computing device, wherein the application comprises a plurality of coroutines;
      determine an address of a common entry point for coroutines, wherein the common entry point is found in a memory of the application;
      identify, using an injected code, at least one stack trace entry for the common entry point;
      detect coroutine context data based on the at least one stack trace entry;
      add an identifier of a coroutine associated with the coroutine context data to a list of detected coroutines; and
      store the list of detected coroutines in target process memory associated with the application.

10. The system of claim 9, wherein the injected code is applied to the application as a live patch that is executed without restarting the application, and wherein the injected code enables detection of stacks that are not page-aligned.

11. The system of claim 9, wherein determining the address of the common entry point is initiated in response to detecting a launch of the application.

12. The system of claim 9, wherein the hardware processor is configured to detect the coroutine context data by:
   tracing a call to a function used for coroutine operation in the application;
   detecting the coroutine context data passed to the function.

13. The system of claim 12, wherein the hardware processor is configured to trace the call by:
   finding, in code of the application, an instruction where a stack pointer register is updated with a value from a register or memory;
   placing a breakpoint on the instruction; and
   detecting the coroutine context data in response to a hit on the breakpoint.

14. A system of claim 9, wherein the hardware processor is configured to:
   apply a patch to a library function used to implement coroutines;
   detect the coroutine context data by accessing registers and memory from the patch.

15. A system of claim 9, wherein the hardware processor is configured to:
   override coroutine implementation functions using a system library mechanism;
   detect the coroutine context data by accessing registers and memory from the overridden coroutine implementation functions.

16. The system of claim 9, wherein the hardware processor is configured to parse the list of detected coroutines by reading the target process memory associated with the application.

17. A non-transitory computer readable medium storing thereon computer executable instructions for detecting coroutines, including instructions for:
   identifying an application running on a computing device, wherein the application comprises a plurality of coroutines;
   determining an address of a common entry point for coroutines, wherein the common entry point is found in a memory of the application;
   identifying, using an injected code, at least one stack trace entry for the common entry point;

detecting coroutine context data based on the at least one stack trace entry;
adding an identifier of a coroutine associated with the coroutine context data to a list of detected coroutines; and
storing the list of detected coroutines in target process memory associated with the application.

\* \* \* \* \*